Oct. 25, 1927.  
C. R. RANEY  
1,646,459  
COMBINED TUCKER AND STRIPPER FOR BINDING MECHANISMS  
Filed Aug. 18, 1924  
2 Sheets-Sheet 1

Inventor.  
Clemma R. Raney,  
By H. P. Doolittle  
Atty.

Oct. 25, 1927.
C. R. RANEY
1,646,459
COMBINED TUCKER AND STRIPPER FOR BINDING MECHANISMS
Filed Aug. 18, 1924    2 Sheets-Sheet 2
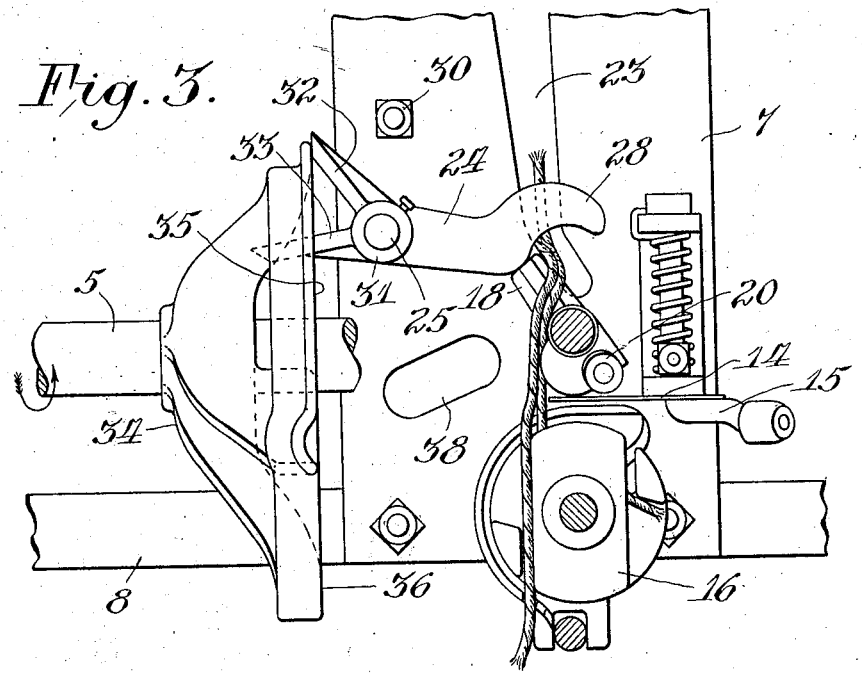
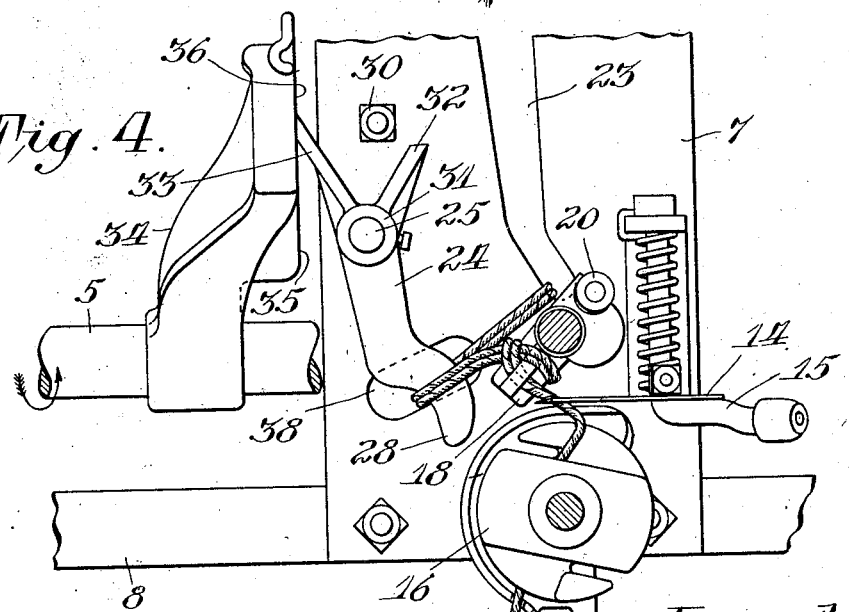
Inventor.
Clemma R. Raney, Patented Oct. 25, 1927.

1,646,459

UNITED STATES PATENT OFFICE.

CLEMMA R. RANEY, OF RIVERSIDE, ILLINOIS, ASSIGNOR TO INTERNATIONAL HARVESTER COMPANY, OF CHICAGO, ILLINOIS, A CORPORATION OF NEW JERSEY.

COMBINED TUCKER AND STRIPPER FOR BINDING MECHANISMS.

Application filed August 18, 1924. Serial No. 732,661.

This invention relates generally to harvesting machinery and particularly to binding mechanisms for grain binders, shockers and the like.

It has for its object to bind a bundle or shock of grain in an improved manner by the provision of an improved and simplified mechanism functioning to tuck and strip the twine with respect to the knotter hook of the knotting mechanism of the binder during and after the tying operation thereof.

Another object is to tie a bundle of grain in a more economic manner by using less twine than is used in prior analogous devices and generally to increase the efficiency and enhance the utility of these mechanisms.

These very desirable objects are attained by the provision of a single member rockable with a rock shaft, controlled by suitable means on the knotter shaft, to perform the combined function of both tucking and stripping the twine with respect to the knotter hook.

In the accompanying sheets of drawings, wherein like characters of reference designate like parts, the preferred embodiment of this invention has been illustrated; it is, of course, to be understood, however, that the mechanism and arrangement shown herein is susceptible of change and modification.

Fig. 3 is an end elevational view similar to Fig. 1 but showing the parts in an intermediate position of the knot tying operation; and Fig. 4 is a similar view showing an advanced step in the operation of the parts with the cord about to be stripped off the hook of the knotter.

Figure 1:
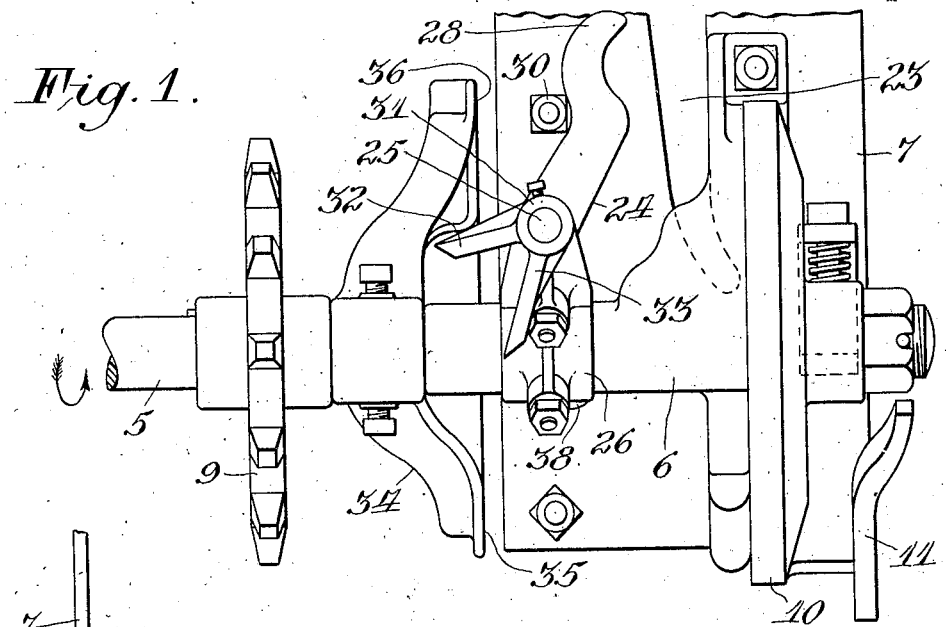
Fig. 1 is an end elevation of the improved mechanism, the upper half of the breast plate being broken off.
Figure 2:
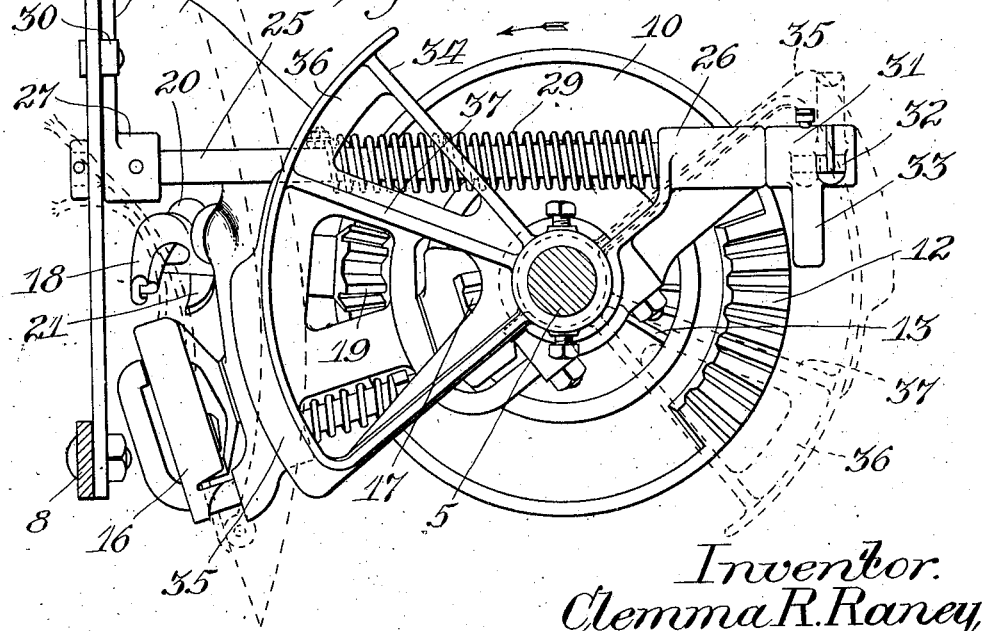
Fig. 2 is a side elevation of the same mechanism shown in Fig. 1 and showing the needle in dotted lines just as the binding operation is initiated.

In carrying out this invention a standard type of knotter mechanism is preferably employed. See patent to Benjamin No. 864,754, of September 10, 1907. It comprises the usual knotter shaft 5 journaled in a bracket 6 bolted or otherwise secured to the knotter breast plate 7, the knotter shaft and breast plate being disposed in parallel relation and carried by the frame member 8. A sprocket wheel 9 serves as a power connection for imparting the desired rotation to the knotter shaft. The knotter shaft has keyed thereto, for rotation therewith, an operating member comprising a mutilated gear wheel 10, this member carrying in the usual way the knife actuating cam 11 (see Fig. 1) and also provided on its face (as shown in Fig. 2) with the usual outer gear face 12 and inner gear face 13. The spring pressed knife mechanism 14 (see Figs. 3 and 4) is supported in proximity to the knotting mechanism in a manner permitting the extended arm 15 thereof to be engaged by the cam 11 when the wheel 10 rotates with the knotter shaft 5. It will be observed that the usual cord holder 16 is positioned slightly below and adjacent the operating member 10, it being rotated intermittently by the pinion 17 from the gear face 13. The conventional knotter hook 18 is driven rotatively by the pinion 19 which intermittently meshes with the outer gear face 12 on the wheel 10. A roller 20 carried by the hook contacts with a cam surface 21 to open the hook so that it may grasp the cord, the tucker member, to be described later, assisting the hook in this respect; while in the hanging or drooping position of the hook shown in Fig. 4 the tucker member functions as a stripper to clear the cord from the hook jaws. The knotter mechanism cooperates with a needle 22 movable through a curved, elongated slot 23 in the breast plate 7. For a further illustration of the roller 20 and cam 21 structure, see the Benjamin patent, supra, and the patent to Johnston No. 737,246, of August 25, 1903.

Prior devices, so far as is known, employed two members for cooperation with the knotter hook; one tucked the twine, while the other stripped the twine from the hook to complete the tying operation. In the simplified construction of the present invention a single member 24 pinned to the inner end of a rock shaft 25 arranged above and at right angles to the knotter shaft performs the dual function of tucking and stripping, as will be later pointed out. One end of the shaft 25 is journaled in the breast plate while the other end is journaled in a bracket 26 carried by the knotter shaft. This combined tucker and stripper arm or member 24 (see Fig. 2) is integrally formed with a sleeve 27 fitting over the shaft 25 adjacent its inner end in such a manner that the arm moves contiguously to and in a plane parallel with the inner face of the breast plate 7, the arm being provided with a hooked end 28 which is adapted to move across the slot in the breast plate in such a manner as to take up slack in the twine and tuck the same around the knotter hook just before the knotting operation commences. A coiled spring 29 surrounding the shaft 25 normally exerts a force to hold the arm 24 raised out of the path of the twine and against the stop or abutment 30 carried by the breast plate. It will also be observed that the outer end of the shaft 25 has fixed thereto a bracket member 31 which has integrally formed thereon a pair of approximately right angularly disposed arms 32 and 33 adapted to cooperate with suitable cam surfaces arranged on the cam member 34 fixed to the knotter shaft 5 in such a manner as to time the downward movement and return of the combined tucker and stripper arm 24. The cam member 34 is provided with the differentially active cam surfaces 35 and 36 with a third cam or rib 37 disposed between the first two cam surfaces mentioned. As already stated the cam member 34 actuates the tucker and stripper arm, the cam surface 35, as the member is rotated, engaging with the arm 32 to rock the shaft 25 against the action of the coil spring to move the arm 24 into tucking position as shown in Fig. 3. The cam member 37 at the end of the cam surface 35 thereupon strikes the other arm 33, pushing it upwardly so that it is engaged by the cam surface 36 to further advance the rock shaft 25 and arm 24 to stripping position shown in Fig. 4, thereby completing the knot tying operation and clearing the twine from the knotter hook. Obviously, when the cam member 34 has rotated so far that the arm 33 has passed off its cam surface 36, the coiled spring exerts a force to rock the shaft 25 in the reverse direction, thereby bringing the tucker and stripper arm back against the stop 30 on the breast plate to its normal inoperative position. An elongated aperture 38 is formed in the breast plate as shown in Figs. 3 and 4. It will be recalled that the arm 24 lies flat against the breast plate, and this aperture 38 accordingly permits free passage of the arm in its rocking movement. Because of the bulkiness or bulging of the twine strands around the arm, it might stick or cause the twine to break, if it were not for this aperture.

A brief description of the operation of this improved mechanism follows:

We will first assume that the parts are positioned as shown in Fig. 2, in which the needle is moving toward knot tying position. The cord holder 16 receives the cord; the knotter hook 18 is clamped shut and so disposed that the cord will pass thereover; and the knife 14 is held back in inoperative position by its spring. The coil spring 29 holds the combined tucker and stripper arm 24 inoperative against the stop 30 (see Figs. 1 and 2). The needle is moving downwardly and the knotter shaft 5 is rotated, the cord holder 16 likewise rotating through its geared connection with the knotter shaft from the position in Fig. 2 to the position shown in Fig. 3, in a manner preventing release of the twine. The cam member 34, of course, rotates with the knotter shaft, one of its cam surfaces engaging the arm 32 to rock the arm 24 to the tucking position shown in Fig. 3, its curved hook face tucking the twine against the hook, the hook in its continued rotation to the position shown in Fig. 4 having been opened by the roller 20 moving over the cam surface 21 to thereby grasp the double strand of twine disposed between the cord holder and hook. The turning movement of the hook 18 now forms the knot in the usual way and the cam 37 causes advance of the other arm 33 to engage the cam surface 36 whereupon the arm 24 is still further rocked ahead, in the meantime straddling the twine and causing it to strip the same from the now closed and hanging or drooping knotter hook, as viewed in Fig. 4, as the latter reaches the end of its rotative movement. The cam 11 secured to and rotating with the wheel 10 now strikes the arm 15 and the knife 14 severs the twine, and the parts thereupon return to their first position shown in Fig. 1 ready for the next tying operation when the needle 22 once more passes through the slot 23. The arm 24 is returned by the coil spring 29.

The present construction is simple and readily adapted for use with standard binding mechanisms without necessitating material change or great expense. It is also economic in its use of twine as it acts to prevent slack by maintaining the twine at all times taut. Furthermore, it overcomes the difficulty of winding encountered by rotating mechanisms, as the present invention employs a rock shaft, and, even if the stripping action should fail, the shaft 25 cannot act as a bobbin and wind the twine.

While there has been illustrated one embodiment of the invention in this application, it should be understood that the form shown herein for purposes of illustration may be modified without departing from the spirit of the invention.

What is claimed is:

1. In a binding mechanism, a knotter shaft, knotter mechanism including a knotter hook actuated thereby, a second shaft movable in timed relation with the knotter mechanism, and a single member movable with said second shaft for tucking binding twine against the knotter hook and stripping the binding twine from the knotter hook at the completion of the tying operation.

2. In a binding mechanism, a knotter shaft, a knotter mechanism including a knotter hook actuated thereby, a rock shaft movable in timed relation with the knotter mechanism, and a single member carried by said rock shaft for tucking binding twine against the knotter hook and stripping the binding twine from the knotter hook at the completion of the tying operation.

3. In a binding mechanism, a knotter shaft, a knotter mechanism including a knotter hook actuated thereby, a supplemental cam carried thereon, a second shaft actuated by said cam, and a single tucker and stripper member movable with the second shaft and cooperating with the knotter hook.

4. In a binding mechanism, a knotter shaft, a knotter mechanism including a knotter hook actuated thereby, a supplemental cam carried thereon, a rock shaft actuated by said cam, and a single tucker and stripper member carried by the rock shaft and cooperating with the knotter hook.

5. In a binding mechanism, a knotter shaft, knotting mechanism including a knotter hook actuated thereby, a second shaft arranged at substantially a right angle to said knotter shaft, operative connections between the shafts, and a single member movable with said second shaft for first tucking binding twine against the knotter hook and then stripping the binding twine from the knotter hook at the completion of the tying operation.

6. In a binding mechanism, a knotter shaft, knotting mechanism including a knotter hook actuated thereby, a rock shaft arranged at substantially a right angle to said knotter shaft, operative connections between the shafts, and a single member carried by and rockable with the rock shaft for first tucking binding twine against the knotter hook and then stripping the binding twine from the knotter hook at the completion of the knot tying operation.

7. In a binding mechanism, a knotter mechanism including a knotter hook, a knotter breast plate, a shaft intermittently operable by the knotter mechanism and journaled in the breast plate, and a single tucker and stripper means on said shaft adjacent the breast plate cooperating with the knotter hook.

8. In a binding mechanism, a knotter mechanism including a knotter hook, a knotter breast plate, a shaft intermittently rockable by the knotter mechanism and journaled in the breast plate, and a single means on said shaft and rockable therewith on the inner side of the breast plate for both tucking and stripping the binding twine with respect to the knotter hook.

9. In a binding mechanism, a frame, a knotter shaft journaled thereon, knotter mechanism including a knotter hook actuated by the knotter shaft, a cam mounted on said shaft adjacent the knotter mechanism having a plurality of active surfaces, a tucker and stripper shaft journaled in the frame and actuated by said cam, and a single tucker and stripper member movable with the shaft and cooperating with the knotter hook in predetermined sequence.

10. In a binding mechanism, a knotter mechanism having a hook movable into drooping position at the completion of the knotting operation, a shaft operable by the knotting mechanism, a combined tucker and stripper member movable with the shaft, and means whereby said member is moved to tucking position during the first stages of the knotting operation and to stripping position during the last stages thereof.

11. In a binding mechanism, a knotter mechanism having a hook movable into drooping position at the completion of the knotting operation, a rock shaft intermittently operable by the knotting mechanism, a combined tucker and stripper carried by the shaft, and means whereby said member is rocked to tucking position during the first stages of the knotting operation and then further rocked to stripping position during the last stages thereof.

12. In a binding mechanism, a knotter shaft, knotting mechanism including a knotter hook actuated thereby, a rock shaft arranged at substantially a right angle to said knotter shaft, operative connections between the shafts, a single member carried by and rockable with the rock shaft for tucking and stripping binding twine with respect to the knotter hook, and means for automatically returning said tucker and stripper member to its initial position.

13. In a binding mechanism, a knotter mechanism including a knotter hook, a knotter breast plate provided with a stop, a shaft operable by the knotter mechanism and journaled in the breast plate, a single member on said shaft adjacent the breast plate for both tucking and stripping binding twine with respect to the knotter hook, and means for holding said member in normal inoperative position abutting the stop on the breast plate.

14. In a binding mechanism, a knotter mechanism including a knotter hook, and a single means controlled by the knotting mechanism for both tucking and stripping binding twine against and from said hook.

15. In a binding mechanism, a knotter mechanism including a knotter hook, and a single rockable member controlled by the knotting mechanism for tucking the binding twine against the hook in one position and in another position for stripping the twine from said hook.

16. In a binding mechanism, the combination of a knotter mechanism, including a knotter hook, and a member operable by said mechanism and controlled thereby for both tucking twine against said hook and stripping twine from said hook.

In testimony whereof I affix my signature.

CLEMMA R. RANEY.